United States Patent
Frenger et al.

(10) Patent No.: US 9,768,847 B2
(45) Date of Patent: Sep. 19, 2017

(54) METHODS AND NETWORK NODES FOR ENABLING ACCURATE MEASUREMENTS (71) Applicant: Telefonaktiebolaget L M Ericsson (publ), Stockholm (SE)

(72) Inventors: Pål Frenger, Linköping (SE); Erik Eriksson, Linköping (SE); Martin Hessler, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 80 days.

(21) Appl. No.: 14/400,017

(22) PCT Filed: Jul. 2, 2014

(86) PCT No.: PCT/SE2014/050835
§ 371 (c)(1),
(2) Date: Nov. 10, 2014

(87) PCT Pub. No.: WO2016/003336
PCT Pub. Date: Jan. 7, 2016

(65) Prior Publication Data
US 2016/0044551 A1 Feb. 11, 2016

(51) Int. Cl.
*H04B 7/06* (2006.01)
*H04W 36/00* (2009.01)
(Continued)

(52) U.S. Cl.
CPC ......... *H04B 7/0617* (2013.01); *H04B 7/0632* (2013.01); *H04W 36/0083* (2013.01);
(Continued)

(58) Field of Classification Search
CPC .......... H04W 36/0083; H04W 36/0094; H04B 7/0632; H04B 7/0617; H04B 7/0408
See application file for complete search history.

(56) References Cited

U.S. PATENT DOCUMENTS 6,615,044 B2 9/2003 Tigerstedt et al.
8,891,458 B2 11/2014 Tenny
(Continued)

FOREIGN PATENT DOCUMENTS

CN 102149123 A 8/2011
EP 1954091 A2 8/2008
(Continued)

*Primary Examiner* — Omer S Mian (74) *Attorney, Agent, or Firm* — Murphy, Bilak & Homiller, PLLC (57) ABSTRACT

The disclosure relates to a method performed in a network node for enabling accurate measurement results for a communication device. The method comprises receiving, from a serving node serving the communication device, a request for measuring on the uplink reference signals from the communication device; receiving, from the communication device, uplink reference signals; obtaining downlink beamforming weights based on the received uplink reference signals; and transmitting, to the communication device, communication device specific downlink reference signals adapted for the communication device by using the downlink beamforming weights. The disclosure also relates to a method performed in a serving network node and corresponding network nodes, computer programs and computer program products.

10 Claims, 6 Drawing Sheets

(51) Int. Cl.
*H04W 16/28* (2009.01)
*H04W 24/10* (2009.01)

(52) U.S. Cl.
CPC ........ *H04W 36/0094* (2013.01); *H04W 16/28* (2013.01); *H04W 24/10* (2013.01)

(56) References Cited

U.S. PATENT DOCUMENTS

| | | | |
|---|---|---|---|
| 2003/0114193 A1* | 6/2003 | Kavak | H04B 7/0617 455/562.1 |
| 2004/0185853 A1 | 9/2004 | Kim et al. | |
| 2007/0032237 A1 | 2/2007 | Chang et al. | |
| 2009/0111381 A1 | 4/2009 | Johnson et al. | |
| 2009/0163216 A1 | 6/2009 | Hoang et al. | |
| 2010/0029278 A1 | 2/2010 | Fang et al. | |
| 2010/0177725 A1* | 7/2010 | van Rensburg | H04W 72/046 370/329 |
| 2014/0080488 A1* | 3/2014 | Michel | H04W 52/0206 455/436 |
| 2014/0094164 A1* | 4/2014 | Hwang | H04B 7/0634 455/423 |
| 2015/0257073 A1* | 9/2015 | Park | H04B 7/0408 370/331 |

FOREIGN PATENT DOCUMENTS

| | | |
|---|---|---|
| WO | 0051389 A1 | 8/2000 |
| WO | 2011002374 A1 | 1/2011 |
| WO | 2014030065 A2 | 2/2014 |
| WO | 2014032271 A1 | 3/2014 |

* cited by examiner

METHODS AND NETWORK NODES FOR ENABLING ACCURATE MEASUREMENTS

TECHNICAL FIELD

The technology disclosed herein relates generally to the field of wireless communication and in particular to methods and network nodes for enabling accurate measurement results for a communication device.

BACKGROUND

Recent advancement in antenna technology is expected to enable increasingly advanced antennas to be deployed in cellular radio networks. Antennas that are re-configurable in terms of beam-shape, so called re-configurable antenna systems (RAS) are already in use. Beam-forming and communication device beam-tracking is also gaining momentum. Further still, it is expected that very large antennas comprising several hundreds individually controlled antenna elements will become available within a near future.

Advanced antenna solutions are very promising but they also bring along a set of new challenges that will need to be addressed. A difficulty that may arise when the network nodes use antenna devices of different types, and with different degrees of advanced signal processing, is that measurements performed by different network nodes may not be entirely comparable for different reasons.

Introduction of advanced adaptive antennas may for example make measurements in downlink, i.e. from network node to communication device, less useful e.g. for making handover decisions. In current state-of-the-art networks, such as Long Term Evolution (LTE), the communication device estimates a post-handover quality of a candidate node by comparing cell specific reference signals received power (RSRP) measurements made towards candidate target nodes in order to establish possible performance after handover.

SUMMARY

Figure 1:
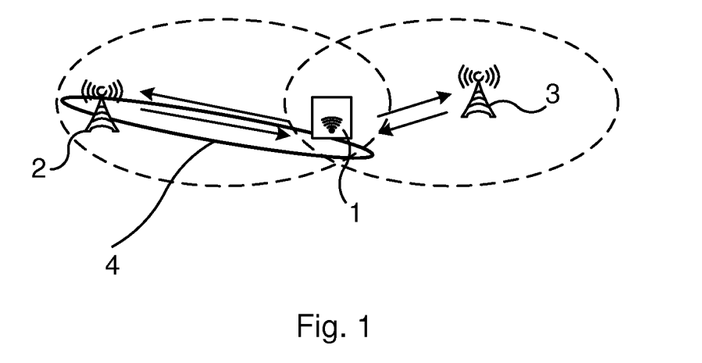
FIG. 1 illustrates downlink handover related measurements in a wireless network.

With high gain adaptive beamforming estimations based on downlink measurements may not be relevant since the cell specific reference signals from target nodes may be sent under different prerequisites than the signaling from a node currently serving a communication device. FIG. 1 illustrates the above: in adaptive beamforming, the downlink (DL) beams 4 from a first network node indicated at reference numeral 2, can be made narrow thus reaching the communication device 1 with high gain and creating low interference towards other communication devices. However, this means that measurements made by the communication device 1 towards other network nodes, such as a second network node indicated at reference numeral 3, is less relevant for comparison purposes.

A communication device may experience a very good reception to its serving node, e.g. the first network node 2, when it provides a beamformed signaling. When performing reference signal received power (RSRP) measurements towards candidate nodes, e.g. the second network node 3, in order to establish if a handover would be in order, the signaling from the candidate nodes would in most cases not be not as good as the signaling quality received by the serving node, since the beamformed signaling can be made reaching the UE with a very high gain. However, this can be a less valuable comparison, since as soon as the UE moves and is no longer reached by the narrow beamformed signaling from its serving node, the candidate nodes could indeed offer better wireless links to the UE, and hence a handover would have been advantageous.

Measurements in uplink, i.e. from communication device 1 to network node 2, 3, in candidate nodes could then be used instead, since such measurements in the candidate node, for instance the second network node 3, can utilize receiver beamforming and give a more accurate view of possible performance after handover. In order to enable uplink based mobility measurements and procedures a currently serving network node, for instance network node 2, or some other network node, may for example order the communication device 1 to transmit active mode mobility reference signals (MRSs). Candidate network nodes 3 can be instructed to measure and report on a particular MRS or they can autonomously detect such signal and perform and report such measurements. The uplink based handover measurements can for example be triggered by downlink measurements or based on communication device location estimates.

However, the uplink measurements may suffer from another comparison issue. There may be large systematic errors that are not accounted for when producing the uplink measurements, the network nodes e.g. being calibrated with different accuracy. Further, totally different antennas, e.g. in terms of type of antenna and/or number of antenna elements, and receiving (RX) processing may have been used in the different measurements. The network nodes may for example have different gain, beamforming capability, sensitivity, etc. Comparing such results may thus also be misleading in that they are measured with different accuracy depending on the capabilities of the respective network nodes and their calibration status. When performing handover measurements in the communication device, as in the downlink based handover, these problems are to a large extent avoided since it is most often one single device, the communication device, that performs all the measurements. That is, since the communication device does all the measurements, and any systematic errors that these errors contained in the measurements will likely not affect a decision based on measurements comparisons as the same systematic error is added for all measurements.

In case the measurements are performed in different network nodes, as in the uplink-based handover procedure, then the situation is different.

Figure 2:
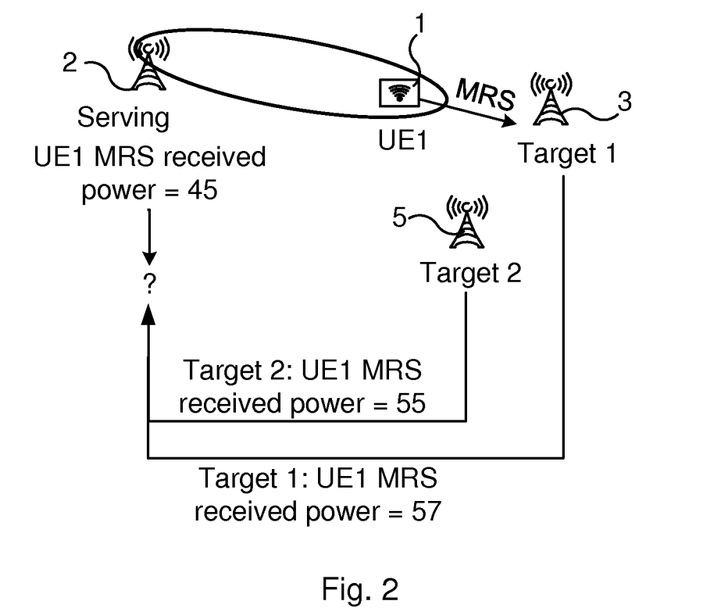
FIG. 2 illustrates uplink measurements for e.g. handover decisions in a wireless network.

FIG. 2 depicts a scenario where measurements performed by different network nodes 2, 3, 5 (also denoted Serving, Target 1, Target 2 in the FIG. 2) needs to be compared e.g. for the purpose of evaluating a handover decision. The serving node 2 is the node currently serving a communication device and may measure on mobility reference signals from the communication device 1, obtaining a received power of e.g. 45 dB, while the two target nodes 3, 5, which are candidates for becoming the communication device's serving node, provide measurement results of e.g. 57 dB and e.g. 55 dB, respectively. However, the accuracy of these measurement results may be inadequate depending on calibration status of the network nodes performing the measurements. Thus the results e.g. for the purpose of making handover decisions may result in poor performance, e.g. handovers being made although resulting in the communication device 1 getting a worsened link quality.

There is thus a need for enabling accurate and relevant mobility related measurements in wireless networks, in particular when implementing advanced antenna solutions.

An object of the present disclosure is to solve or at least alleviate at least one of the above mentioned problems.

The object is according to a first aspect achieved by a method performed in a network node for enabling accurate measurement results for a communication device. The method comprises: receiving, from a serving node serving the communication device, a request for measuring on the uplink reference signals from the communication device; receiving, from the communication device, uplink reference signals; obtaining downlink beamforming weights based on the received uplink reference signals; transmitting, to the communication device, communication device specific downlink reference signals adapted for the communication device by using the downlink beamforming weights.

The method enables downlink measurements to be used for mobility decisions even in a wireless network in which different nodes have different beamforming capabilities and/or antenna capabilities. Downlink measurement reports relating to different target nodes and received in a serving node from a communication device are comparable even if the network nodes use different antenna systems and/or different complexity in beamforming, since the downlink signaling on which the communication device is to measure gives estimations on the best possible wireless link to each network node. Further, the method is advantageous also in that it enables calibration of uplink measurements to be performed in multiple network nodes.

The object is according to a second aspect achieved by a network node for enabling accurate measurement results for a communication device. The network node is configured to receive, from a serving node serving the communication device, a request for measuring on the uplink reference signals from the communication device; receive, from the communication device, uplink reference signals; determine downlink beamforming weights based on the received uplink reference signals; transmit, to the communication device, communication device specific downlink reference signals adapted for the communication device by using the downlink beamforming weights.

The object is according to a third aspect achieved by a computer program comprising computer program code for causing a network node to perform the method above when the computer program code is executed on a processor of the network node.

The object is according to a fourth aspect achieved by a computer program product comprising a computer program as above, and a computer readable means on which the computer program is stored.

The object is according to a fifth aspect achieved by a method performed in a serving network node for obtaining accurate measurement results for a communication device, the serving network node serving the communication device. The method comprises receiving, from the communication device, one or more measurement reports comprising downlink quality estimates based on downlink reference signals adapted by beamforming weights for the communication device, wherein the downlink reference signals have been adapted and transmitted by a respective one or more neighboring network node.

The object is according to a sixth aspect achieved by a serving network node for obtaining accurate measurement results for a communication device, the serving network node serving the communication device. The serving network node is configured to receive, from the communication device, one or more measurement reports comprising downlink quality estimates based on downlink reference signals adapted by beamforming weights for the communication device, wherein the downlink reference signals have been adapted and transmitted by a respective one or more neighboring network node.

The object is according to an seventh aspect achieved by a computer program comprising computer program code for causing a serving network node to perform the method above when the computer program code is executed on a processor of the serving network node.

The object is according to an eight aspect achieved by a computer program product comprising a computer program as above, and a computer readable means on which the computer program is stored.

Further features and advantages of the present disclosure will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, the present disclosure enables downlink measurements to be used for e.g. mobility decisions in a wireless network in which different nodes have different beamforming and antenna capabilities.

Figure 3:
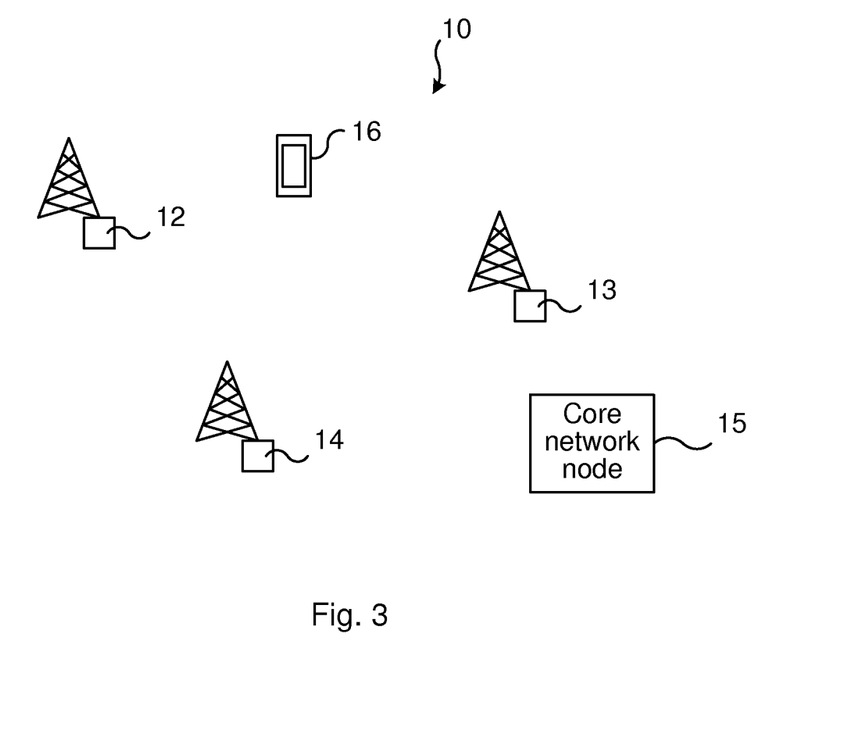
FIG. 3 illustrates schematically an environment in which embodiments of the present disclosure may be implemented.

FIG. 3 illustrates schematically an environment in which embodiments of the present disclosure may be implemented. A wireless network 10, e.g. an LTE network, comprises a number of network nodes 12, 13, 14, enabling communication devices 16 to communicate over wireless links. Such network nodes 12, 13, 14 may be denoted in different ways, e.g. radio access node, base station, radio base station, evolved node B (eNB) etc. Also the communication devices 16 may be denoted differently, e.g. mobile station, wireless device, user equipment (UE), etc. The communication device 16 may comprise e.g. a smart phone, a tablet etc. In the following the communication device is referred to as UE 16.

The network nodes 12, 13, 14 thus enable communication devices 16 to communicate wirelessly. To this end, the network nodes 12, 13, 14 each provide communication coverage in one or more geographical area(s), denoted cells.

The wireless network 10 typically comprises various other network nodes, such as Mobility Management Entity (MME), or operation and maintenance (O&M) nodes, packet data network gateways, serving gateways etc. Such other network nodes are collectively and schematically illustrated as core network node with reference numeral 15.

Different network nodes 12, 13, 14 of the wireless network 10 may have different capabilities in view of beamforming, some may have a high beamforming capability, while others have no or less advanced beam-forming capability. Such differences may be due to their respective number of antenna devices, antenna elements, signal processing etc. As is known within the art, in beamforming a network node may send and receive signals for a particular UE in the direction of that particular UE. By advanced signal processing each UE's signals are multiplied with complex weights that adjust the magnitude and phase of the signal to and from each antenna of the network node's antenna system. With knowledge of the channel between each antenna element at the network node and each element at the UE, antenna element weights can be calculated to maximize the received signal strength at the UE, or to reduce interference towards other scheduled users.

The present disclosure provides, in an aspect, improved handover decisions to be made based on downlink signaling. That is, the downlink measurements are, in an aspect, made comparable to each other even though the serving node and targets node may have different capabilities regarding antenna system and beamforming. A well-founded decision on possible handover to a network node with a high beamforming capability is enabled. The transmission of UE specific mobility reference signals from a target node to a UE 16 under handover evaluation is proposed. Such procedure is described in the following.

A UE 16 has a first network node 12, to which it is connected, in the following denoted serving node 12. The wireless network 10 may comprise a second network node 13 as well as a third network node 14 which may both be seen as candidate nodes for being the new serving node of the UE 16: first target node 13 and second target node 14. A serving node is a node towards which a UE has a connection, and for instance control signaling is typically performed between the UE and its serving node. A target node may be a node towards which the UE has a signal strength high enough for the UE to perform downlink measurements and possibly initiate a handover to, e.g. if the signal strength towards the target node becomes better than the signal strength towards the currently serving node. The network nodes 12, 13, 14 are all typically serving nodes for some UEs and target nodes for others.

Figure 4:
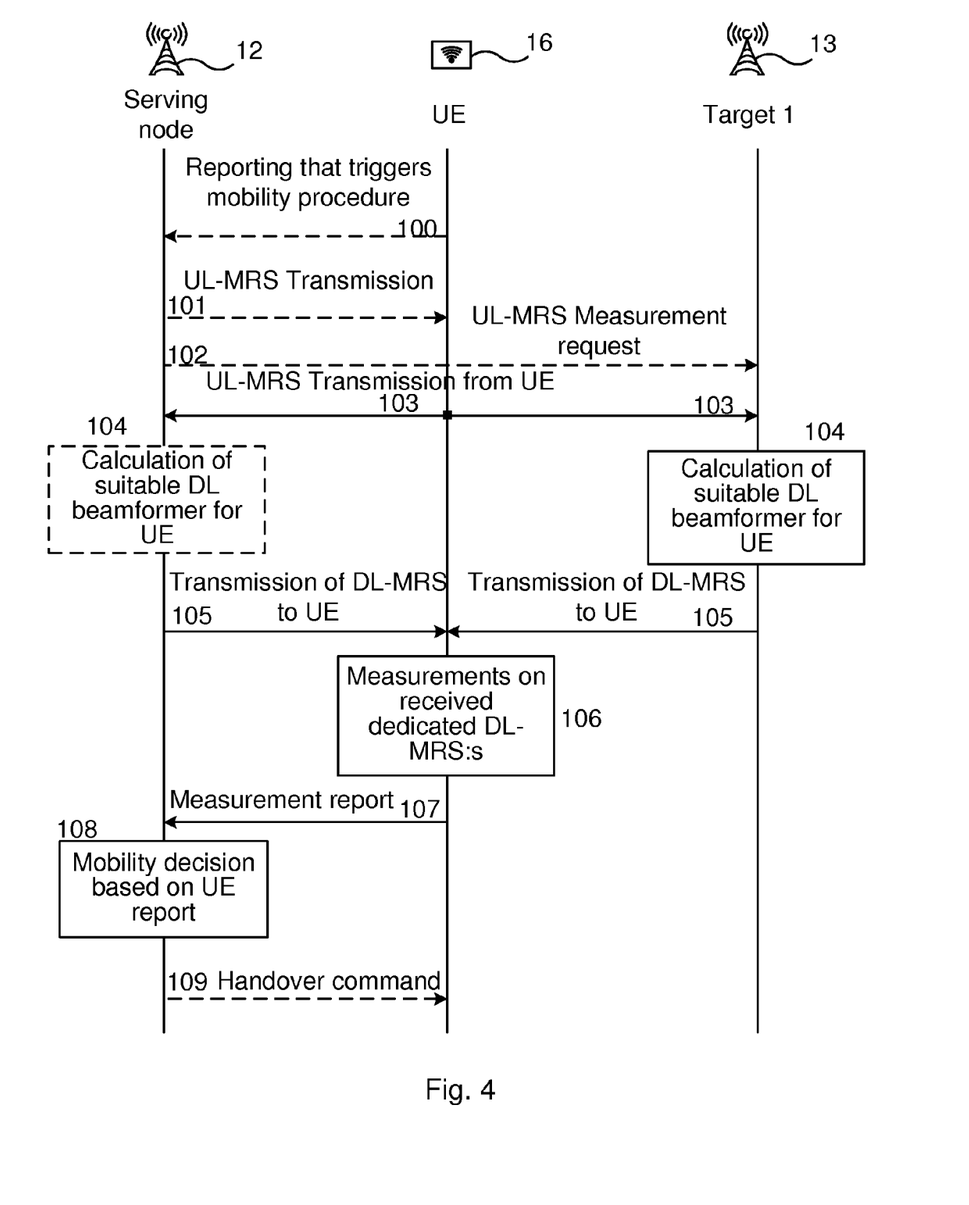
FIG. 4 is a sequence diagram illustrating use of communication device specific reference signals.

FIG. 4 is a sequence diagram illustrating use of UE specific downlink reference signals. In an aspect, effectuated e.g. by signaling as illustrated in FIG. 4, a method based on the below steps may be implemented.

The UE 16 measures on non-beamformed downlink reference signals from the first target node 13 and/or second target node 14 and reports the measurement(s) to its serving node 12. Such reporting may be done once the measurement is above a certain threshold. This is a conventional downlink measurement, where the UE 16 measures on omni-directional reference signals transmitted by the target nodes 13, 14.

The serving node 12 (or some other network node, or the UE 16) decides that an uplink mobility reference signals needs to be transmitted from the UE 16 for a first target node 13 to measure on. Examples of such uplink mobility reference signal comprise a new signal easily detected in neighbor cells, or an existing LTE signal such as a Physical Random Access Channel (PRACH) signal or a sounding reference signal (SRS). The choice of signal may for instance depend on whether all measuring nodes are assumed to be well synchronized or not.

The first target node 13 uses the uplink mobility reference signals transmitted from the UE 16 in order to estimate suitable transmission beam-forming weights for this particular UE 16.

The first target node 13 then transmits UE specific mobility reference signals in the downlink. The UE specific mobility reference signals are beamformed according to the beam-forming weights estimated by the first target node 13. At the same time other nodes, e.g. the serving node 12 and/or the second target node 14, may do the same, i.e. measure on the uplink mobility reference signal, estimate transmission beam-forming weights and transmit a downlink reference signals using the beam-forming weights.

The UE 16 may measure on all the UE specific downlink mobility reference signals it receives and reports the measurement to the serving node 12 if needed. That is, the reports may not be needed if they are irrelevant for some reason, such as if the received signals are too weak, then the target node is not a good candidate to which to hand over the UE 16. The measurement reports may thus be needed if signals measured from target nodes 13, 14 are such that a handover may be considered, i.e. the signals are strong enough for the target node to be considered.

FIG. 4 illustrating a sequence diagram illustrating use of UE specific downlink reference signals is now described more in detail. An exemplary embodiment on how the present teachings may be used will thus be described in the following.

First, some triggering action is made, that triggers the UE 16 to perform the procedure according to an aspect of the present disclosure, which procedure may be used for mobility decisions. This triggering action may comprise steps that are known as such. For example, the UE 16 might measure on common downlink mobility reference signals (arrow 100), such as a Common Reference Signals (CRS) in LTE, in order to trigger this procedure. As another example, the serving node 12 might have ordered the UE 16 to transmit a particular UL-MRS (arrow 101) and it might also have requested some neighboring nodes (e.g. first target node 13) to perform measurements on this UL-MRS (arrow 102). It is noted that neighboring nodes that are mainly of interest, e.g. in order to make a handover decision, comprise those that are candidate nodes for being the next serving node for the UE 16, such candidate nodes may comprise all or a subset of the neighboring nodes and are also denoted target nodes in the present disclosure.

At arrows 103, the UE 16 transmits uplink mobility reference signals (UL-MRS), which may be received by one or more network nodes 12, 13.

When receiving the UL-MRS sent by the UE 16, at least the first target node 13 and possibly further target nodes, calculates (indicated at reference numeral 104) a suitable downlink beamformer for this particular UE 16 based on the received signal (UL-MRS). The serving node 12 might already have calculated a suitable DL beamformer in a previous step, as indicated at 104 by the dashed box, else it also calculates such DL beamformer for the UE 16 based on the received signal (UL-MRS) sent by the UE 16.

The first target node 13 and the serving node 12 (and possibly further target nodes) then uses the calculated DL beamforming weights in order to transmit UE specific downlink mobility reference signals for the UE 16 to measure on (arrows denoted 105). The network nodes, e.g. first target node 13 and serving node 12, thus each transmit downlink mobility reference signals that are, in contrast to known reference signals, adapted for this particular UE 16. Each network node performs its own calculations to get their respective UE specific downlink mobility reference signals, which most likely are differently beamformed signals.

The UE 16 receives one or more such dedicated DL-MRS and uses them to perform mobility measurements (box indicated by reference numeral 106). The UE 16 then sends a measurement report to the serving node 12 (arrow 107).

At box 108, the serving node 12 evaluated the received measurement report and makes a mobility decision.

At (dashed) arrow 109, a handover command may be sent to the UE 16, if the decision is that a handover should be made. The handover procedure following the signaling as described (arrows 100-108) may as such be performed according to known methods.

It is noted that in case the UE 16 has several reception antennas and is capable of performing reception beamforming then actual mobility measurement (i.e. measurement on the DL-MRS that the network nodes 12, 13 sends) may be performed using different reception beamformers for each network node 12, 13. This enables the UE 16 to perform a mobility measurement that better corresponds to the actual post-handover performance that it can expect from each network node 12, 13.

The UE 16 may transmit the UL-MRS (see arrows 103 of FIG. 4) on request or autonomously. If the UE 16 sends them autonomously then neighboring nodes, such as first target node 13 and second target node 14 and any other neighboring nodes, need to listen continuously for such signals. The serving node 12 may register e.g. by inter-node signaling, e.g. X2 interface, in neighboring nodes that it wants to receive measurements (listener-reporter) that are associated with a particular UL-MRS. Furthermore the UEs can select by them sell if they want to use a less accurate mobility procedure that does not involve using UE specific uplink and downlink mobility reference signals, e.g. based on service level, required Quality of Service (QoS) etc.

If the transmission of UL-MRS from the UE 16 is done on request from the source node 12 then neighboring nodes may listen and report only upon receiving such request from the serving node 12. In this case the serving node 12 can select less accurate mobility procedure based on service level, required QoS etc.

The network nodes may choose not to transmit a UE specific DL-MRS, e.g. if a target node 13, 14 is in dormant mode, or have too much traffic at the moment. In such cases, the target node may not anyway be able to serve the UE 16 to possibly be handed over.

The embodiments of the present disclosure may be used as the only handover solution in a future system, such as e.g. 5G or evolved 4G.

As briefly mentioned earlier in relation to FIG. 2, measurements made by the different network nodes may not be accurately compared, also since they may not be calibrated against each other. It is noted that steps of the above described procedure may also be used as a way of calibrating uplink measurements performed by the network nodes. Based on the measurement reports obtained from the UE, uplink measurements performed by each of the two or more network nodes 12, 13, 14 can be calibrated by adding to their uplink measurements a respective node specific calibration offset. Such calibration offset, specific for each node, may be determined in different ways. Once the measurements are calibrated there is no need to further transmit beamformed DL-MRS for the UE 16 to measure on. Using the calibrated UL-MRS measurements will give a sufficient accuracy.

Non-beamformed DL-MRS measurements and beamformed DL-MRS from the same target node may be used for determining calibration offsets. Thereby it may be possible to utilize non-beamformed downlink reference signals (pilots) to estimate a potential performance on a beamformed channel from the target node. In particular, by requesting the UE 16 to report both a non-beamformed as well as beamformed DL-MRS from the same node, e.g. the first target node 13, a node specific beam-forming gain factor may be estimated for this node (again, e.g. the first target node 13). The beam-forming gain may be defined as the improvement of using beamformed transmission compared to using omnidirectional transmission. A non-beamformed DL-MRS, e.g. an omnidirectional reference signal transmission, may then be used in future handover decisions to estimate a potential post-handover quality from a target node. For example, if the beam-forming gain for the first target node 13 is estimated to x dB, then the source node 12 can use this knowledge by using a non-beamformed signal and adding the beamforming gain of x dB to decide whether or not a handover to the first target node 13 should be done.

Still further, also systematic measurements errors made in the UEs may be observed and compensated for by comparing calibrated uplink measurements with downlink measurements performed by the UE.

The present disclosure thus presents a procedure comprising one or more neighboring nodes transmitting a beamformed downlink MRS signals to a specific UE in response to that UE transmitting an uplink MRS. The UE may receive several UE specific DL-MRS to measure on, and a handover decision may be performed in the serving node by comparing the received DL-MRS report(s) from the UE.

The various features of the present disclosure that have been described can be combined in different ways, examples of which are given in the following.

Figure 5:
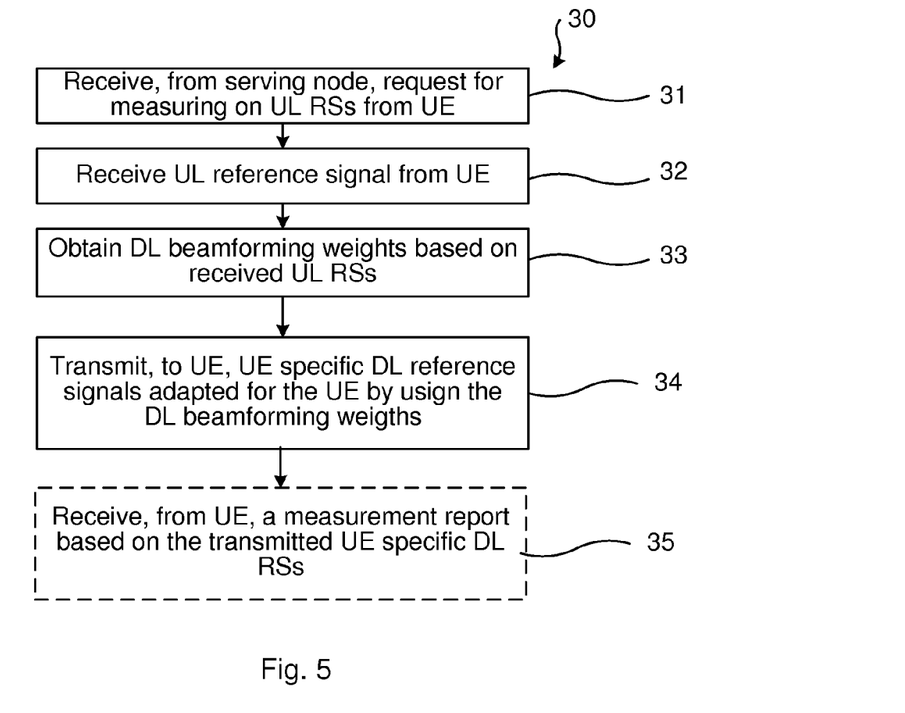
FIG. 5 illustrates a flow chart over steps of a method in a network node in accordance with the present disclosure.

FIG. 5 illustrates a flow chart over steps of a method in a network node in accordance with the present disclosure. The method 30 may be performed in a network node 13, 14 for enabling accurate measurement results for a communication device 16. The method 30 may in particular be used for enabling a mobility decision to be made based on downlink signaling.

The method 30 comprises receiving 31, from a serving node 12 serving the communication device 16, a request for measuring on the uplink reference signals from the communication device 16.

The method 30 comprises receiving 32, from the communication device 16, uplink reference signals.

The method 30 comprises obtaining 33 downlink beamforming weights based on the received uplink reference signals. The network node 13, 14 may obtain such downlink beamforming weights by performing calculations based on the received uplink reference signals. As another example, the network node 13, 14 may obtain such downlink beamforming weights by sending measurement values of the received uplink reference signal to another node, which performs the calculations, and sends back the results of the calculations, i.e. the downlink beamforming weights, to the network node 13, 14. The network node 13, 14 may thus obtain the downlink beamforming weights by receiving them from another node.

The method 30 comprises transmitting 34, to the communication device 16, communication device specific downlink reference signals adapted for the communication device 16 by using the downlink beamforming weights.

The method 30 may be performed in a network node that is a neighboring network node 13, 14 to the serving network node 12, and which may thus be a target node to which the communication device could be handed over. It is noted that a network node may typically be the serving node for one set of communication devices and the target node for another set of communication devices.

As mentioned, the method 30 is usable for enabling a mobility decision to be made based on downlink signaling. Irrespective of how the various network nodes are equipped in view of antennas and other transmission/reception devices: since each relevant network node, e.g. serving and target nodes, provides downlink signaling that is specifically adapted for the communication device at hand, the communication device can measure on these signals and send reports that are comparable. The downlink signaling on which the communication device is to measure gives estimations on the best possible wireless link to each network node of relevance (e.g. each network node being in such relation to the communication device that it can or could service it), hence making the measurements comparable.

In an embodiment, the method 30 comprises receiving 35, from the communication device 16, a measurement report comprising downlink quality estimates based on the transmitted communication device specific downlink reference signals. The dashed lines of box 35 indicates that this step is optional.

In an embodiment, the method 30 comprises transmit, to the serving node 12, a measurement report comprising the downlink quality estimate.

Figure 6:
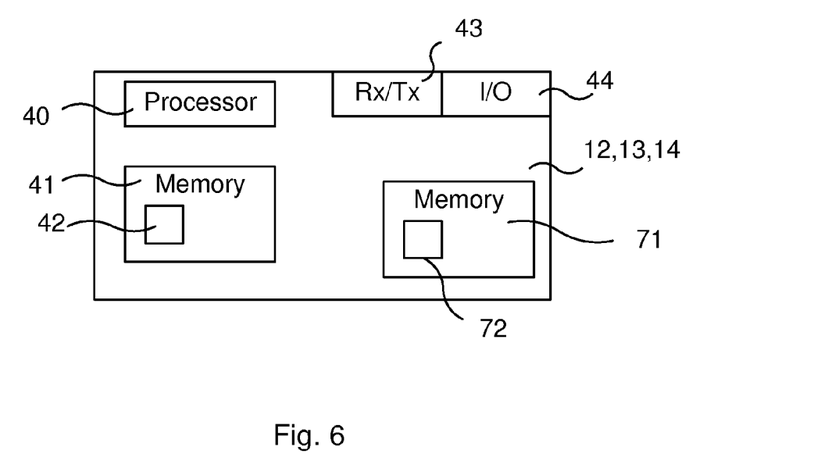
FIG. 6 illustrates schematically a network node and means for implementing embodiments of the methods of the present disclosure.

FIG. 6 illustrates schematically a network node and means for implementing methods of the present disclosure.

The network node 12, 13, 14 comprises a transceiver unit 43 for wireless communication with communication devices 16. The transceiver unit 43 may comprise processing circuitry for processing signals transmitted and received by the transceiver unit. The transceiver unit 43 may further comprise a transmitter and a receiver both coupled to antennas, such transmitter and receiver using known radio processing and signal processing components and techniques.

The network node 12, 13, 14 comprises an interface device or input/output device 44 for communicating with other network nodes, typically in a wired fashion. An example of an interface by means of which two network nodes may communicate comprises X2 interface.

The network node 12, 13, 14 comprises a processor 40 comprising any combination of one or more of a central processing unit (CPU), multiprocessor, microcontroller, digital signal processor (DSP), application specific integrated circuit etc. capable of executing software instructions stored in a memory 41, which can thus be a computer program product 41. The processor 40 can be configured to execute any of the various embodiments of the method as described herein, for instance in relation to FIG. 5. The network node 12, 13, 14 may be configured such e.g. by comprising a processor 40; and one or more memories 41, 71 storing instructions that, when executed by the processor 40, causes the network node 12, 13, 14 to perform the steps of the various embodiments.

In particular, a network node 13, 14 is provided for enabling accurate measurement results for a communication device 16. The network node 13, 14 is configured to:

receive, from a serving node 12 serving the communication device 16, a request for measuring on the uplink reference signals from the communication device 16, receive, from the communication device 16, uplink reference signals, obtain downlink beamforming weights based on the received uplink reference signals, transmit, to the communication device 16, communication device specific downlink reference signals adapted for the communication device 16 by using the downlink beamforming weights.

In an embodiment, the network node 13, 14 is configured to receive, from the communication device 16, a measurement report comprising downlink quality estimates based on the transmitted communication device specific downlink reference signals.

In an embodiment, the network node 13, 14 is configured to transmit, to the serving node 12, a measurement report comprising the downlink quality estimate.

Still with reference to FIG. 6, the network node 12, 13, 14 may comprise one or more memories 41, 71. The memory 41, 71 may for instance be any combination of random access memory (RAM) and read only memory (ROM), Flash memory, magnetic tape, Compact Disc (CD)-ROM, digital versatile disc (DVD), Blueray disc etc. The memory 41, 71 may also comprise persistent storage, which, for example, can be any single one or combination of magnetic memory, optical memory, solid state memory or even remotely mounted memory.

A data memory may also be provided (not illustrated) for reading and/or storing data during execution of software instructions in the processor 40. Such data memory can for instance be any combination of random access memory (RAM) and read only memory (ROM).

The present disclosure also encompasses computer program 42 comprising computer program code for causing a network node 13, 14 to perform the method as described herein, e.g. as described above in relation to FIG. 5 when the computer program code is executed on at least one processor 40 of the network node 13, 14.

The present disclosure also encompasses a computer program product 41 comprising a computer program 42 as described above, and a computer readable means on which the computer program 42 is stored.

Figure 7:
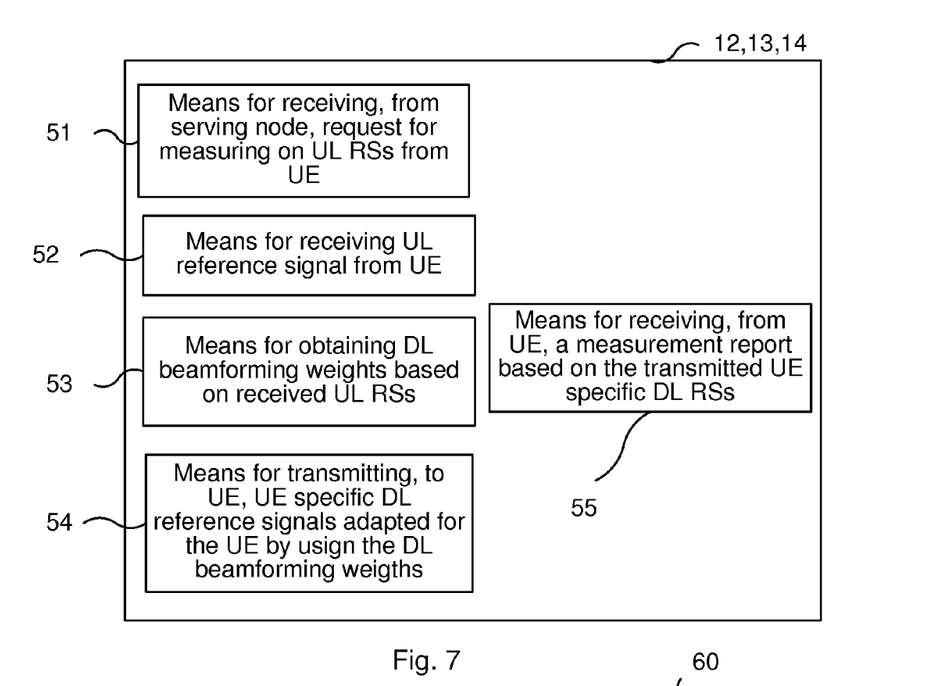
FIG. 7 illustrates a network node comprising function modules/software modules for implementing embodiments of methods of the present disclosure.

An example of an implementation using function modules/software modules is illustrated in FIG. 7, in particular illustrating a network node 12, 13, 14 comprising function modules and/or software modules for implementing embodiments of the method 30.

The network node 12, 13, 14 may comprise first means 51, for example a first function module, for receiving, from a serving node 12 serving the communication device 16, a request for measuring on the uplink reference signals from the communication device 16. Such means may for example comprise processing circuitry configured to receive signaling from a serving node e.g. via an interface.

The network node 12, 13, 14 may comprise second means 52, for example a second function module, for receiving, from the communication device 16, uplink reference signals. Such means may for example comprise processing circuitry configured to receive signaling from the communication device 16 via antenna(s) and transceiver circuitry.

The network node 12, 13, 14 may comprise third means 53, for example a third function module, for obtaining downlink beamforming weights based on the received uplink reference signals. Such means may comprise processing circuitry, adapted to obtain such downlink beamforming weights, e.g. calculating them, by using program code stored in memory.

The network node 12, 13, 14 may comprise fourth means 54, for example a fourth function module, for transmitting, to the communication device 16, communication device specific downlink reference signals adapted for the communication device 16 by using the downlink beamforming weights. Such means may for example comprise processing circuitry configured to transmit signaling to the communication device 16 via antenna(s) and transceiver circuitry.

The network node 12, 13, 14 may comprise fifth means 55, for example a fifth function module, for receiving, from the communication device 16, a measurement report comprising downlink quality estimates based on the transmitted communication device specific downlink reference signals. Such means may for example comprise processing circuitry configured to receive signaling from a communication device 16 e.g. via antennas and transceiver circuitry.

The network node 12, 13, 14 may comprise yet additional means (not illustrated) for performing additional steps of the various embodiments of the method. For instance, the network node 12, 13, 14 may comprise means for transmitting, to the serving node 12 a measurement report comprising the downlink quality estimate. Such means may for example comprise processing circuitry configured to transmit signaling to another network node e.g. via an interface.

The function modules 51, 52, 53, 54, 55 may thus be implemented using software instructions such as computer program executing in a processor and/or using hardware, such as application specific integrated circuits, field programmable gate arrays, discrete logical components etc.

Figure 8:
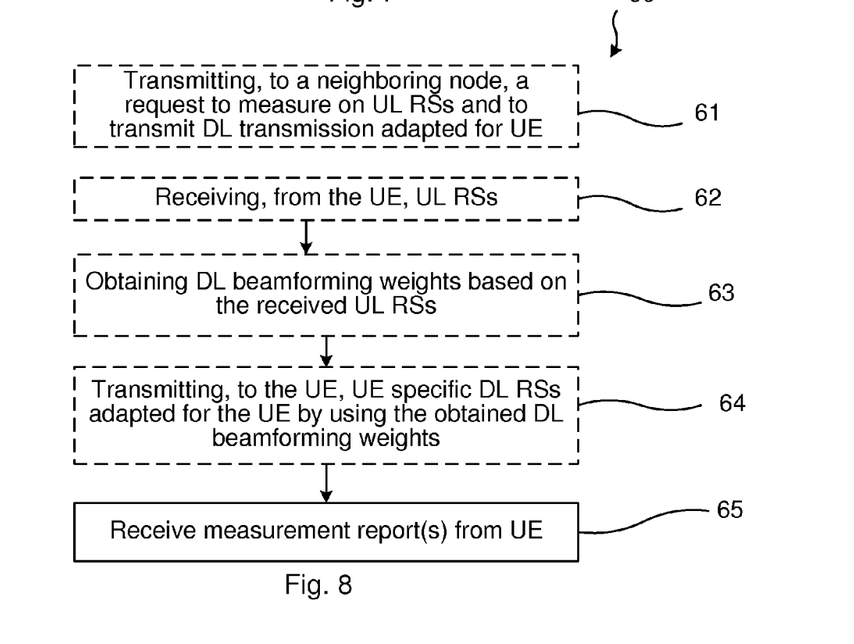
FIG. 8 illustrates a flow chart over steps of a method in a serving network node in accordance with the present disclosure.

FIG. 8 illustrates a flow chart over steps of a method 60 in a serving network node in accordance with the present disclosure. In the flow chart, the boxes drawn with dashed lines indicate optional steps. The method 60 may thus be performed in a serving network node 12 for obtaining accurate measurement results for a communication device 16 which it serves. The method 60 comprises receiving 65, from the communication device 16, one or more measurement reports comprising downlink quality estimates based on a downlink reference signals adapted by beamforming weights for the communication device 16, wherein the downlink reference signals have been adapted and transmitted by a respective one or more neighboring network node 13, 14. Examples of such downlink quality estimates comprise estimates of received quality, e.g. Signal-to-Interference-plus-Noise Ratio (SINR), or estimates of received power, e.g. Reference Signal Received Power (RSRP).

It is again noted that a network node may typically be the serving node for one set of communication devices and the target node for another set of communication devices. A network node may thus implement the method 30 as described with reference to FIG. 5 as well as the method 60 described with reference to FIG. 8, in their various embodiments.

In an embodiment, the method 60 may comprise, prior to the receiving 65, transmitting, to a neighboring network node 13, 14 a request to measure on uplink reference signals from the communication device (16) and to transmit a downlink transmission that is adapted by beamforming weights for the communication device 16 based on the measurement.

In an embodiment, the method 60 may comprise transmitting, to the neighboring network node 13, 14, a request for a measurement report on the uplink reference signals from the communication device 16.

In an embodiment, the method 60 may comprise:
receiving 62, from the communication device 16, uplink reference signals,
obtaining 63 downlink beamforming weights based on the received uplink reference signals,
transmitting 64, to the communication device 16, communication device specific downlink reference signals adapted for the communication device (16) by using the obtained downlink beamforming weights.

In an embodiment, the method 60 may comprise receiving, from the communication device 16, a measurement report comprising downlink quality estimates based on the transmitted communication device specific downlink reference signals.

In an embodiment, the method 60 may comprise transmitting, to one or more neighboring nodes 13, 14, a measurement report comprising the downlink quality estimate.

In an embodiment, the method 60 may comprise:
receiving, from the communication device 16, a first measurement report based on a measurement of non-beamformed reference signals transmitted from the neighboring network node 13, and a second measurement report based on a measurement of a downlink transmission adapted by beamforming weights for the communication device 16, and
estimating a beam-forming gain factor for the neighboring network node 13 based on the first and second measurement reports.

In an embodiment, the method 60 may comprise making a mobility decision for the communication device 16 based on the one or more received measurement reports.

In an embodiment, the method 60 may comprise, before the receiving 65:
transmitting, to the communication device 16, a request for transmission of uplink reference signals.

In an aspect, a serving network node 12 is provided for obtaining accurate measurement results for a communication device 16. The serving network node 12 is configured to receive, from the communication device 16, one or more measurement reports comprising downlink quality estimates based on downlink reference signals adapted by beamforming weights by a respective one or more neighboring network node 13, 14 for the communication device 16 and transmitted from the one or more neighboring network nodes 13, 14.

In an embodiment, the serving network node 12 may be configured to, prior to the receiving transmit, to a neighboring network node 13, 14, a request to measure on uplink reference signals from the communication device 16 and to transmit a downlink transmission that is adapted by beamforming weights for the communication device 16 based on the measurement.

In an embodiment, the serving network node 12 may be configured to:
transmit, to the neighboring network node 13, a request for a measurement report on the uplink reference signals from the communication device 16.

In an embodiment, the serving network node 12 may be configured to:
receive, from the communication device 16, uplink reference signals,
obtain downlink beamforming weights based on the received uplink reference signals, transmit, to the communication device 16, communication device specific downlink reference signals adapted for the communication device 16 by using the obtained downlink beamforming weights.

In an embodiment, the serving network node 12 may be configured to receive, from the communication device 16, a measurement report comprising downlink quality estimates based on the transmitted communication device specific downlink reference signals.

In an embodiment, the serving network node 12 may be configured to transmit, to one or more neighboring nodes 13, 14, a measurement report comprising the downlink quality estimate.

In an embodiment, the serving network node 12 may be configured to:

receive, from the communication device 16, a first measurement report based on a measurement of non-beamformed reference signals transmitted from the neighboring network node 13, and a second measurement report based on a measurement of a downlink transmission adapted by beamforming weights for the communication device 16, and estimate a beam-forming gain factor for the neighboring network node 13 based on the first and second measurement reports.

In an embodiment, the serving network node 12 may be configured to make a mobility decision for the communication device 16 based on the one or more received measurement reports.

In an embodiment, the serving network node 12 may be configured to, prior to the receiving, transmit, to the communication device 16, a request for transmission of uplink reference signals.

The serving network node 12 may additionally be configured to perform the method 30 as described in relation to FIG. 5, and comprise the means, components and devices as described in relation to FIG. 6 for performing also the method 60 as described in relation to FIG. 8.

The present disclosure also encompasses computer program 72 comprising computer program code for causing a serving network node 12 to perform the method as described herein, e.g. as described above in relation to FIG. 8 when the computer program code is executed on at least one processor 40 of the serving network node 12.

The present disclosure also encompasses a computer program product 71 comprising a computer program 72 as described above, and a computer readable means on which the computer program 72 is stored.

Figure 9:
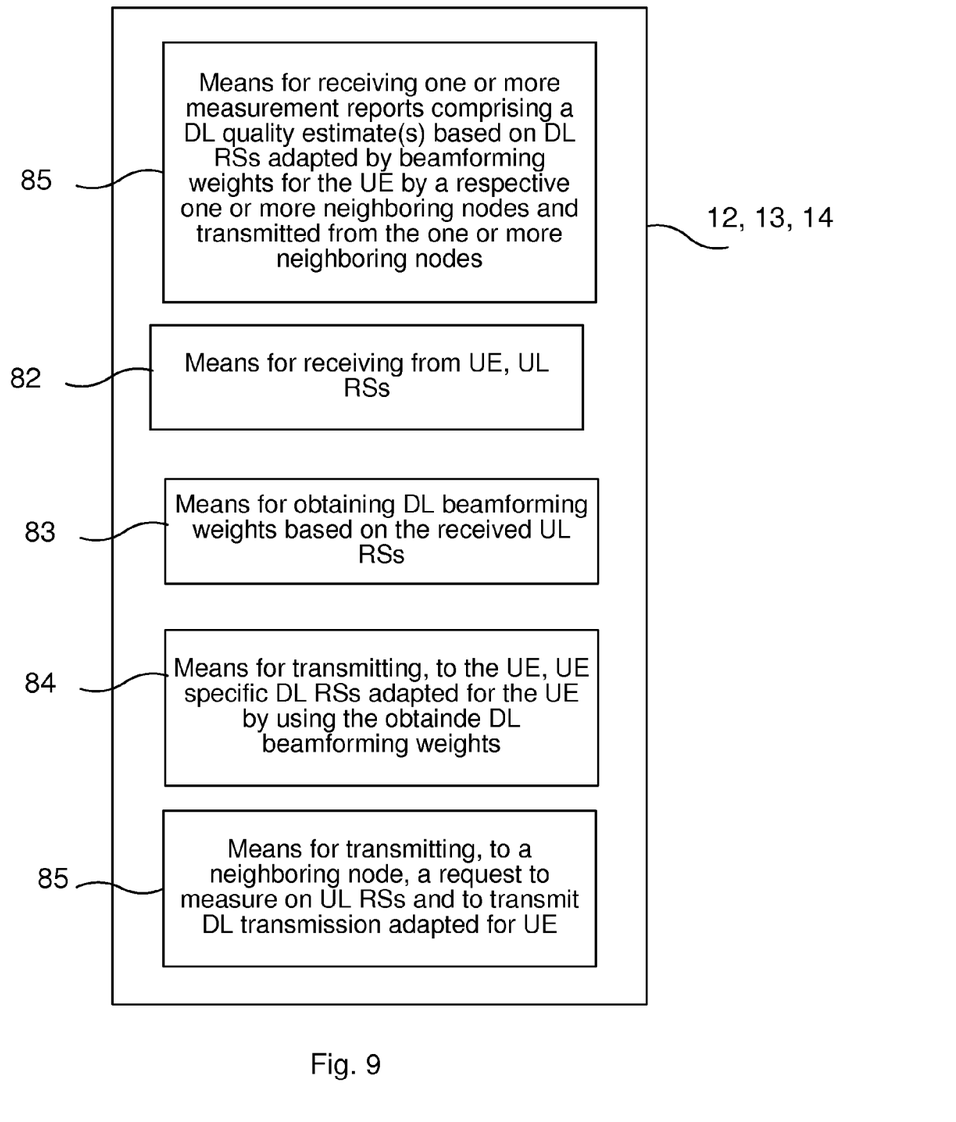
FIG. 9 illustrates a serving network node comprising function modules/software modules for implementing embodiments of the methods of the present disclosure.

An example of an implementation using function modules/software modules is illustrated in FIG. 9, in particular illustrating a serving network node 12 comprising function modules and/or software modules for implementing embodiments of the method 60.

The serving network node 12 may comprise first means 85, for example a first function module, for receiving, from the communication device 16, one or more measurement reports comprising downlink quality estimates based on downlink reference signals adapted by beamforming weights for the communication device 16, wherein the downlink reference signals have been adapted and transmitted by a respective one or more neighboring network node 13, 14. Such means may for example comprise processing circuitry configured to receive signaling from the communication device 16 via antenna(s) and transceiver circuitry.

The serving network node 12 may comprise yet additional means for performing the steps of the various embodiments of the method 60. For example, the serving network node 12 may comprise means 85 for, prior to the receiving, transmitting, to a neighboring network node 13, 14, a request to measure on uplink reference signals from the communication device 16 and to transmit a downlink transmission that is adapted by beamforming weights for the communication device 16 based on the measurement. Such means may comprise processing circuitry configured to transmit signaling to a neighboring network node e.g. via an interface.

The serving network node 12 may comprise means for transmitting, to the neighboring network node 13, a request for a measurement report on the uplink reference signals from the communication device 16. Such means may comprise processing circuitry configured to transmit signaling, comprising e.g. a request, to a neighboring network node e.g. via an interface and cable.

The serving network node 12 may comprise means 82 for receiving, from the communication device 16, uplink reference signals, means 83 for obtaining downlink beamforming weights based on the received uplink reference signals, and means 84 for transmitting, to the communication device 16, communication device specific downlink reference signals adapted for the communication device 16 by using the obtained downlink beamforming weights. Such means may comprise processing circuitry configured to receive signaling from the communication device 16 e.g. via antennas and transceiver circuitry; processing circuitry adapted to obtain such beam-forming weights, e.g. calculating it, using program code stored in memory; processing circuitry configured to transmit signaling to the communication device 16 e.g. via antennas and transceiver circuitry.

The serving network node 12 may comprise means for receiving, from the communication device 16, a measurement report comprising downlink quality estimates based on the transmitted communication device specific downlink reference signals. Such means may comprise processing circuitry configured to receive signaling from the communication device 16 e.g. via antennas and transceiver circuitry.

The serving network node 12 may comprise means for transmitting, to one or more neighboring nodes 13, 14, a measurement report comprising the downlink quality estimate. Such means may comprise processing circuitry configured to transmit signaling to neighboring nodes 13, 14 e.g. via an interface and cables.

The serving network node 12 may comprise means for receiving, from the communication device 16, a first measurement report based on a measurement of non-beamformed reference signals transmitted from the neighboring network node 13, and a second measurement report based on a measurement of a downlink transmission adapted by beamforming weights for the communication device 16, and means for estimating a beam-forming gain factor for the neighboring network node 13 based on the first and second measurement reports. Such means may comprise processing circuitry configured to receive signaling from the communication device 16 e.g. via antennas and transceiver circuitry; processing circuitry adapted to estimate such beam-forming gain factor, e.g. calculating it, by using program code stored in a memory.

The serving network node 12 may comprise means for making a mobility decision for the communication device 16 based on the one or more received measurement reports. Such means may comprise processing circuitry adapted to make such decision by using program code stored in a memory.

The serving network node 12 may comprise means for, before the receiving transmitting, to the communication device 16, a request for transmission of uplink reference signals. Such means may comprise processing circuitry configured to transmit signaling, comprising e.g. a request, to a neighboring network node e.g. via an interface.

The means 81, 82, 83, 84, 85 as well as other means as exemplified above may thus be implemented using software instructions such as computer program executing in a processor and/or using hardware, such as application specific integrated circuits, field programmable gate arrays, discrete logical components etc.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed by a first network node operating in a wireless communication network, the method comprising:
   receiving a measurement report from a communication device being served by the first network node, the measurement report indicating signal measurements made by the communication device on non-beamformed downlink reference signals transmitted by a neighboring, second network node;
   deciding in dependence on the measurement report to evaluate the second network node as a handover target for serving the communication device and, in response:
   requesting the communication device to transmit uplink mobility reference signals;
   requesting the second network node to make measurements on the uplink mobility reference signals, the second network node being operative to transmit beamformed downlink reference signals for the communication device, using beamforming weights determined from the measurements made by the second network node on the uplink mobility reference signals;
   making measurements on the uplink mobility reference signals and transmitting beamformed downlink reference signals for the communication device using beamforming weights determined from the measurements made by the first network node;
   receiving a further measurement report from the communication device, the further measurement report indicating signal measurements made by the communication device on the beamformed downlink reference signals transmitted by the second network node, and further indicating signal measurements made by the communication device on the beamformed downlink reference signals transmitted by the first network node; and
   initiating handover of the communication device from the first network node to the second network node in dependence on evaluating the further measurement report.

2. The method of claim 1, wherein initiating handover of the communication device from the first network node to the second network node in dependence on evaluating the further measurement report comprises determining that the communication device experiences a higher received signal strength for the beamformed downlink reference signals transmitted for the communication device by the second network node as compared to the beamformed downlink reference signals transmitted for the communication device by the first network node.

3. The method of claim 1, wherein the second network node comprises one of two or more neighboring network nodes, and wherein the method includes requesting the two or more neighboring network nodes to make measurements on the uplink mobility reference signals, each neighboring network node being operative to transmit respective beamformed downlink reference signals for the communication device, and wherein the further measurement report indicates signal measurements made by the communication device on the respective beamformed downlink signals, and wherein initiating handover of the communication device comprises selecting a particular one of the neighboring network nodes based on determining that the communication device experiences a higher received signal strength for the respective beamformed downlink reference signals transmitted by the particular neighboring network node, as compared to the beamformed downlink reference signals transmitted by the first network node for the communication device.

4. The method of claim 1, wherein initiating handover of the communication device from the first network node to the second network node in dependence on evaluating the further measurement report comprising sending a handover command to the communication device to initiate handover from the first network node to the second network node, in response to determining from the further measurement report that the beamformed downlink reference signals transmitted by the second network node for the communication device are received at the communication device at a higher signal strength than the beamformed downlink reference signals transmitted by the first network node for the communication device.

5. A method performed by a communication device operating in a wireless communication network and being served by a first network node, the method comprising:
   receiving non-beamformed downlink reference signals transmitted by a second network node that neighbors the first network node;
   making measurements on the non-beamformed downlink reference signals;
   transmitting a measurement report to the first network node, the measurement report indicating the measurements made on the non-beamformed downlink reference signals;
   receiving a request from the first network node to transmit uplink mobility reference signals and, in response, transmitting uplink mobility reference signals;
   receiving beamformed downlink reference signals transmitted by the first network node according to beamforming weights calculated by the first network node in dependence on the uplink mobility reference signals, as received by the first network node;
   receiving beamformed downlink reference signals transmitted by the second network node according to beamforming weights calculated by the second network node in dependence on the uplink mobility reference signals, as received by the second network node;
   making measurements on the beamformed downlink reference signals transmitted by the first and second network nodes; and
   transmitting a further measurement report to the first network node, the further measurement report indicating the measurements made on the beamformed downlink reference signals transmitted by the first and second network nodes.

6. A first network node configured for operation in a wireless communication network, the first network node comprising:

first communication circuitry configured for communicating with other network nodes operating in the wireless communication network;

second communication circuitry configured for wirelessly communicating with communication devices operating in the wireless communication network; and processing circuitry operatively associated with the first and second communication circuitry and configured to:
receive a measurement report from a communication device being served by the first network node, the measurement report indicating signal measurements made by the communication device on non-beamformed downlink reference signals transmitted by a second network node that neighbors the first network node;
decide in dependence on the measurement report to evaluate the second network node as a handover target for serving the communication device and, in response:
request the communication device to transmit uplink mobility reference signals;
make measurements on the uplink mobility reference signals and transmit beamformed downlink reference signals for the communication device using beamforming weights determined from the measurements made by the first network node;
request the second network node to make measurements on the uplink mobility reference signals, the second network node being operative to transmit beamformed downlink reference signals for the communication device using beamforming weights determined from the measurements made by the second network node on the uplink mobility reference signals;
receive a further measurement report from the communication device, the further measurement report indicating signal measurements made by the communication device on the beamformed downlink reference signals transmitted by the second network node, and further indicating signal measurements made by the communication device on the beamformed reference signals transmitted by the first network node; and
initiate handover of the communication device from the first network node to the second network node, in dependence on evaluating the further measurement report.

7. The first network node of claim 6, wherein the processing circuitry is configured to initiate handover of the communication device from the first network node to the second network node based on determining from the further measurement report that the communication device experiences a higher received signal strength for the beamformed downlink reference signals transmitted for the communication device by the second network node as compared to the beamformed downlink reference signals transmitted for the communication device by the first network node.

8. The first network node of claim 6, wherein the second network node comprises one of two or more neighboring network nodes, and wherein the processing circuitry is configured to request the two or more neighboring network nodes to make measurements on the uplink mobility reference signals, each neighboring network node being operative to transmit respective beamformed downlink reference signals for the communication device, and wherein the further measurement report indicates signal measurements made by the communication device on the respective beamformed downlink signals, and wherein the processing circuitry is configured to initiate handover of the communication device by selecting a particular one of the neighboring network nodes, based on determining that the communication device experiences a higher received signal strength for the respective beamformed downlink reference signals transmitted by the particular neighboring network node, as compared to the beamformed downlink reference signals transmitted by the first network node for the communication device.

9. The first network node of claim 6, wherein the processing circuitry is configured to initiate handover of the communication device from the first network node to the second network node by sending a handover command to the communication device to initiate handover from the first network node to the second network node, in response to determining from the further measurement report that the beamformed downlink reference signals transmitted by the second network node for the communication device are received at the communication device at a higher signal strength than the beamformed downlink reference signals transmitted by the first network node for the communication device.

10. A communication device configured for operation in a wireless communication network, the communication device comprising:
communication circuitry configured to communicate with network nodes in the wireless communication network;
processing circuitry operatively associated with the communication circuitry and configured to:
receive non-beamformed downlink reference signals transmitted by a second network node that neighbors a first network node that is serving the communication device;
make measurements on the non-beamformed downlink reference signals;
transmit a measurement report to the first network node, the measurement report indicating the measurements made on the non-beamformed downlink reference signals;
receive a request from the first network node to transmit uplink mobility reference signals and, in response, transmitting uplink mobility reference signals;
receive beamformed downlink reference signals transmitted by the first network node according to beamforming weights calculated by the first network node in dependence on the uplink mobility reference signals, as received by the first network node;
receive beamformed downlink reference signals transmitted by the second network node according to beamforming weights calculated by the second network node in dependence on the uplink mobility reference signals, as received by the second network node;
make measurement on the beamformed downlink reference signals transmitted by the first and second network nodes; and
transmit a further measurement report to the first network node, the further measurement report indicating the measurements made on the beamformed downlink reference signals transmitted by the first and second network nodes.

* * * * *